United States Patent
Liu et al.

(10) Patent No.: US 11,368,977 B2
(45) Date of Patent: *Jun. 21, 2022

(54) DATA TRANSMISSION METHOD AND APPARATUS

(71) Applicant: HUAWEI TECHNOLOGIES CO., LTD., Guangdong (CN)

(72) Inventors: Le Liu, Shenzhen (CN); Zhou Lan, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 27 days.

This patent is subject to a terminal disclaimer.

(21) Appl. No.: 16/913,342

(22) Filed: Jun. 26, 2020

(65) Prior Publication Data

US 2020/0329491 A1    Oct. 15, 2020

Related U.S. Application Data

(63) Continuation of application No. 16/368,300, filed on Mar. 28, 2019, now Pat. No. 10,716,135, which is a
(Continued)

(51) Int. Cl.
*H04W 74/00* (2009.01)
*H04W 74/04* (2009.01)
(Continued)

(52) U.S. Cl.
CPC ......... *H04W 74/002* (2013.01); *H04L 5/0007* (2013.01); *H04L 5/0044* (2013.01);
(Continued)

(58) Field of Classification Search
CPC ........... H04W 74/002; H04W 72/0406; H04W 74/04; H04W 72/0453; H04W 72/0446;
(Continued)

(56) References Cited

U.S. PATENT DOCUMENTS

2012/0263156 A1    10/2012   Abraham et al.
2012/0327915 A1*  12/2012   Kang ................... H04L 5/0007
                                                                    370/336
(Continued)

FOREIGN PATENT DOCUMENTS

CN        102714534 A     10/2012
CN        103493420 A      1/2014
(Continued)

OTHER PUBLICATIONS

IEEE 802.1 1-2012, Part 11 Wireless LAN Medium Access Control(MAC) and Physical Layer(PHY) Specifications; IEEE Computer Society, dated Mar. 29, 2012, total 2793 pages.
(Continued)

*Primary Examiner* — Hashim S Bhatti
(74) *Attorney, Agent, or Firm* — Fish & Richardson P.C.

(57) ABSTRACT

The present invention discloses a data transmission method, apparatus, and system, and an access point. An example method includes: transceiving data of a data portion in an uplink OFDMA PPDU scheduled by an access point AP on a corresponding allocated frequency resource unit RU, determining one or more fundamental channel units on which the allocated frequency resource unit RU is located, and transceiving at least some fields in a common signaling portion in the uplink OFDMA PPDU on the determined one or more fundamental channels. In some implementations, one or more fundamental channels for transceiving at least some fields in a common signaling portion in an uplink OFDMA PPDU are determinate, and another user can transceive data on another idle fundamental channel, thereby improving channel utilization. In addition, multiple users can simultaneously transceive data on multiple fundamental channels, thereby improving a service transmission rate.

19 Claims, 4 Drawing Sheets

Related U.S. Application Data continuation of application No. 15/819,048, filed on Nov. 21, 2017, now Pat. No. 10,674,533, which is a continuation of application No. PCT/CN2015/079496, filed on May 21, 2015.

(51) Int. Cl.
  *H04L 5/00* (2006.01)
  *H04L 27/26* (2006.01)
  *H04W 72/04* (2009.01)
  *H04W 74/08* (2009.01)

(52) U.S. Cl.
  CPC .......... *H04L 5/0053* (2013.01); *H04L 5/0094* (2013.01); *H04L 27/2602* (2013.01); *H04W 72/0406* (2013.01); *H04W 72/0453* (2013.01); *H04W 74/04* (2013.01); *H04W 72/0446* (2013.01); *H04W 74/0816* (2013.01)

(58) Field of Classification Search
  CPC ........... H04W 74/0816; H04L 27/2602; H04L 5/0007; H04L 5/0044; H04L 5/0053; H04L 5/0094
  See application file for complete search history.

(56) References Cited

U.S. PATENT DOCUMENTS

| | | | |
|---|---|---|---|
| 2013/0301569 A1 | 11/2013 | Wang et al. | |
| 2014/0307612 A1 | 10/2014 | Vermani et al. | |
| 2014/0314036 A1 | 10/2014 | Takeda et al. | |
| 2014/0362845 A1 | 12/2014 | Lee et al. | |
| 2015/0117368 A1 | 4/2015 | Barriac et al. | |
| 2016/0088602 A1* | 3/2016 | Seok | H04L 5/0055 370/338 |
| 2016/0330714 A1* | 11/2016 | Hedayat | H04W 72/1289 |
| 2017/0303280 A1* | 10/2017 | Chun | H04L 5/0094 |
| 2018/0092123 A1 | 3/2018 | Liu et al. | |

FOREIGN PATENT DOCUMENTS

| | | |
|---|---|---|
| CN | 103931126 A | 7/2014 |
| CN | 104580053 A | 4/2015 |
| EP | 3297385 B1 | 9/2019 |
| JP | 2015525017 A | 8/2015 |
| JP | 2016541165 A | 12/2016 |
| RU | 2470494 C2 | 12/2012 |
| WO | 2013170136 A1 | 11/2013 |
| WO | 2015066326 A1 | 5/2015 |

OTHER PUBLICATIONS

IEEE 802.11-15/0354r1. Woojin Ahn et al., "Bandwidth granularity on UL-OFDMA data allocation," dated Mar. 11, 2015, total 15 pages.

IEEE 802.11ac-2013, IEEE Standard for Information technology—Telecommunications and information exchange between systems; Local and metropolitan area networks—Specific requirements, Part 11: Wireless LAN Medium Access Control(MAC) and Physical Layer (PHY) Specifications; Amendment 4: Enhancements for Very High Throughput for Operation in Bands below 6 GHz, total 425 pages.

IEEE Std 802.11n-2009,Part 11 :Wireless LAN Medium Access Control (MAC) and Physical Layer (PHY) Specifications. Amendment 5: Enhancements for Higher Throughput, dated Sep. 11, 2009, total 536 pages.

XP068082998 IEEE 802.1 1-15/0354r0 Woojin Ahn et al.,"Bandwidth granularity on UL-OFDMA data allocation", dated Mar. 3, 2015, total 16 pages.

XP068094399 IEEE 1 1-15/0550r1 Katsuo Yunoki et al.,"L-Preamble Issues for UL-OFDMA", May 10, 2015, total 18 pages.

XP068094444 IEEE 802.1 1-15/0584r0 Sung ho Moon et al., "Considerations on L TF Sequence Design", dated May 10, 2015, total 14 pages.

XP068094463 IEEE 802.1 1-15/0597r0 Yong ho Seok et al.,"Beamformed HE PPDU", dated May 10, 2015, total 13 pages.

XP068118051 IEEE 802.11-14/1417r0 Yongho Seok et al.,"HEW PPDU Transmission Discussion", dated Nov. 2, 2014, total 13 pages.

Yongho Seok, Ack Procedure for OFDMA, IEEE 802.1 1-14/1211r0, Sep. 14, 2014, 11 pages.

Young Hoon Kwon, SIG Structure for UL PPDU, IEEE 802.1 1-15/0574r0, May 2015, total 17 pages.

Office Action issued in Vietnam Application No. 2017-05116 dated Aug. 30, 2021, 4 pages (English translation).

\* cited by examiner

DATA TRANSMISSION METHOD AND APPARATUS

CROSS-REFERENCE TO RELATED APPLICATIONS

This application is a continuation of U.S. patent application Ser. No. 16/368,300, filed on Mar. 28, 2019, which is a continuation of U.S. patent application Ser. No. 15/819,048, filed on Nov. 21, 2017, now U.S. Pat. No. 10,674,533, which is a continuation of International Application No. PCT/CN2015/079496, filed on May 21, 2015. All of the aforementioned patent applications are hereby incorporated by reference in their entireties.

TECHNICAL FIELD

The present invention relates to the field of network communications technologies, and in particular, to a data transmission method and apparatus.

BACKGROUND

With development of the mobile Internet and popularization of intelligent terminals, data traffic increases rapidly. Because of advantages of a high rate and low costs, a wireless local area network becomes one of mainstream mobile broadband access technologies. In an existing Wi-Fi system, for example, a conventional system based on IEEE 802.11a, a high-throughput system based on IEEE 802.11n, or a very-high-throughput system based on IEEE 802.11ac, uplink data transmission is always point-to-point transmission, that is, on a same channel or in a same spectrum, only one station transceives data to an access point at a same time. Similarly, downlink data transmission is also point-to-point transmission, that is, on a same channel or in a same spectrum, an access point transceives data to only one station at a same time.

In a next-generation Wi-Fi (Wireless Fidelity, wireless local area network) system, for example, a HEW (high efficiency WLAN) system, higher requirements are imposed on a service transmission rate of a wireless local area system. However, limited by a single channel or a single frequency band, the existing point-to-point transmission manner cannot meet the high-speed service transmission requirement.

SUMMARY

In view of this, the present invention provides a data transmission method, apparatus, and system, and an access point, different channel resources are allocated to different stations at a same moment, that is, multiple stations can access a channel at a same moment, thereby improving a service transmission rate.

Solutions of the present invention are as follows:

A first aspect of embodiments of the present invention provides a data transmission method including: determining a size of a frequency resource that is needed by a data portion in an uplink OFDMA PPDU scheduled by an access point AP, and allocating a corresponding frequency resource unit RU for transceiving the data portion in the uplink OFDMA PPDU; determining one or more fundamental channel units on which the allocated frequency resource unit RU is located: and transceiving the data portion in the uplink OFDMA PPDU on the allocated frequency resource unit RU, and transceiving at least some fields in a common signaling portion in the uplink OFDMA PPDU on the determined one or more fundamental channels.

In an implementation manner in the first aspect of the embodiments of the present invention, the transceiving at least some fields in a common signaling portion in the uplink OFDMA PPDU on the determined multiple fundamental channels includes: repeatedly transceiving, by using the determined multiple fundamental channels on a per fundamental-channel basis, the at least some fields in the common signaling portion in the uplink OFDMA PPDU on the multiple fundamental channels.

In a third implementation manner in the first aspect of the embodiments of the present invention, the data portion in the uplink OFDMA PPDU includes uplink user data and/or uplink user MAC control signaling.

In a fourth implementation manner in the first aspect of the embodiments of the present invention, the at least some fields in the common signaling portion that are transceived on the one or more fundamental channels include: a legacy preamble and an HE-SIG-A, or a legacy preamble, an HE-SIG-A, and an HE-SIG-B.

In a fifth implementation manner in the first aspect of the embodiments of the present invention, when the at least some fields in the common signaling portion in the uplink OFDMA PPDU frame include only a legacy preamble, the data portion in the uplink OFDMA PPDU frame includes only ACK signaling, or the data portion in the uplink OFDMA PPDU frame includes uplink user data and uplink user ACK signaling, where the ACK signaling belongs to MAC signaling, and the ACK signaling is located in a frequency resource on a basis of per fundamental channel unit.

A second aspect of the embodiments of the present invention provides a data transmission apparatus including: an allocation unit, configured to: determine a size of a frequency resource that is needed by a data portion in an uplink OFDMA PPDU scheduled by an access point AP, and allocate a corresponding frequency resource unit RU for transceiving the data portion in the uplink OFDMA PPDU; a determining unit, configured to determine one or more fundamental channel units on which the allocated frequency resource unit RU is located; and a transmission unit, configured to: transceive the data portion in the uplink OFDMA PPDU on the allocated frequency resource unit RU, and transceive at least some fields in a common signaling portion in the uplink OFDMA PPDU on the determined one or more fundamental channels.

In a second implementation manner in the second aspect of the embodiments of the present invention, the transmission unit includes a first transmission unit, configured to repeatedly transceive, by using the determined multiple fundamental channels on a per fundamental-channel basis, the at least some fields in the common signaling portion in the uplink OFDMA PPDU on the multiple fundamental channels.

A third aspect of the embodiment of the present invention provides an access point including any data transmission apparatus as described above.

A fourth aspect of the embodiments of the present invention provides a data transmission system including: a memory having a storage medium, where the memory stores a data transmission program used to transceive data in the uplink OFDMA PPDU; and a processor that is connected to the memory by using a bus where when data transmission is performed in the uplink OFDMA PPDU, the processor invokes the data transmission method program stored in the memory, and executes the data transmission program according to any data transmission method provided in the first aspect.

It can be learnt from the foregoing technical solutions that, in the embodiments of this application, an OFDMA (Orthogonal Frequency Division Multiple Access) technology is introduced based on the IEEE (Institute of Electrical and Electronics Engineers) 802.11ax standard. Data of a data portion in an uplink OFDMA PPDU scheduled by an access point AP is transceived on a corresponding allocated frequency resource unit RU, one or more fundamental channel units on which the allocated frequency resource unit RU is located are determined, and at least some fields in a common signaling portion in the uplink OFDMA PPDU are transceived on the determined one or more fundamental channels. In this way, one or more fundamental channels for transceiving at least some fields in a common signaling portion in an uplink OFDMA PPDU are determinate. When another user in a conventional 802.11a/b/n/ac and 802.11ax BSS performs detection according to conventional CCA, the user detects that the one or more fundamental channels for transceiving at least some fields in the common signaling portion in the uplink OFDMA PPDU are busy, and the user can transceive data on another idle fundamental channel, thereby improving channel utilization. In addition, multiple users can simultaneously transceive data on multiple fundamental channels, thereby improving a service transmission rate.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To resolve the problem of how to improve a service transmission rate, the inventor finds in the research process that, an OFDMA (orthogonal frequency division multiple access) technology is introduced based on the IEEE (Institute of Electrical and Electronics Engineers) 802.11ax standard. According to the OFDMA technology, an air interface radio channel time-frequency resource is divided into multiple RBs (resource block), and the multiple RBs may be shared simultaneously and orthogonal in a frequency domain. After the OFDMA technology is introduced, uplink data transmission is multipoint-to-point transmission instead of point-to-point transmission. That is, on a same channel or in a same spectrum, multiple stations transmit data to an access point at a same time. In addition, downlink data transmission is point-to-multipoint transmission instead of point-to-point transmission. Based on this, the inventor considers some multipoint-to-point transmission manners, for example, a first manner and a second manner.

In the First Manner:

A data portion in an uplink OFDMA PPDU is transceived on a frequency resource unit RU allocated in advance, and a common signaling portion in the uplink OFDMA PPDU is duplicated over each fundamental channel in a channel bandwidth. The frequency resource unit RU is smaller than a fundamental channel unit. The term "transceived" herein may refer to transmitting, receiving or both: for example, a transceived uplink OFDMA PPDU is a PPDU transmitted by a station and received by an AP.

In the Second Manner:

Both a data portion and a common signaling portion in an uplink OFDMA PPDU are transceived on a frequency resource unit RU allocated in advance. The frequency resource unit RU is smaller than a fundamental channel unit.

However, after further studying these considered transmission manners, the inventor finds that these transmission manners have various problems.

For example, in the first transmission manner, when another user in a conventional 802.11a/b/n/ac and 802.11ax BSS performs detection according to conventional CCA, because the common signaling portion in the uplink OFDMA PPDU is duplicated over each fundamental channel in a channel bandwidth, it is detected that energy on each fundamental channel in the channel bandwidth is higher than a specified CCA standard. That is, it is detected that each fundamental channel is busy. The foregoing transmission manner prevents another user in the BSS from contending for an idle fundamental channel for a data portion, and this is not conducive to improving frequency spectrum utilization. In addition, energy of an uplink user data portion concentrates on an allocated RU when the data is sent, while the front common signaling portion is transceived on multiple fundamental channels. As a result, power for receiving the front common signaling portion and power for receiving the back data portion do not match at a receive end.

In the second transmission manner, when another user in a conventional 802.11a/b/n/ac and 802.11ax BSS detects a common signaling portion in a conventional manner, although content of common signaling portions sent by uplink users is the same, a common signaling portion that is finally transceived to a receive end may be incomplete because each scheduled uplink user performs sending only on an RU that is allocated in advance and that is smaller than a fundamental channel unit, and a frequency resource unit RU accommodates a limited size of resources.

Therefore, to resolve the foregoing problems, embodiments of the present invention provide a multipoint-to-point transmission manner. In the transmission manner, data of a data portion in an uplink OFDMA PPDU (physical layer convergence protocol data unit) scheduled by an access point AP is transceived on a corresponding allocated frequency resource unit RU, one or more fundamental channel units on which the allocated frequency resource unit RU is located are determined, and at least some fields in a common signaling portion in the uplink OFDMA PPDU are transceived on the determined one or more fundamental channels. In this way, one or more fundamental channels for transceiving at least some fields in a common signaling portion in an uplink OFDMA PPDU are determinate. When another user in a conventional 802.11a/b/n/ac and 802.11ax BSS performs detection according to conventional CCA, the user detects that the one or more fundamental channels for transceiving the at least some fields in the common signaling portion in the uplink OFDMA PPDU are busy, and the user can transceive data on another idle fundamental channel, thereby improving channel utilization. In addition, multiple users can simultaneously transceive data on multiple fundamental channels, thereby improving a service transmission rate.

In addition, because the at least some fields in the common signaling portion in the uplink OFDMA PPDU are transceived on the one or more fundamental channels, and a fundamental channel has a relatively large capacity, the one or more fundamental channels are capable of accommodating the at least some fields in the common signaling portion in the uplink OFDMA PPDU. Therefore, a complete common signaling portion is finally transceived to a receive end through the one or more fundamental channels, and transmission signaling is not lost in a transmission process.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A specific process is described in detail in the following embodiments disclosed in the present invention.

Embodiment 1

Figure 1:
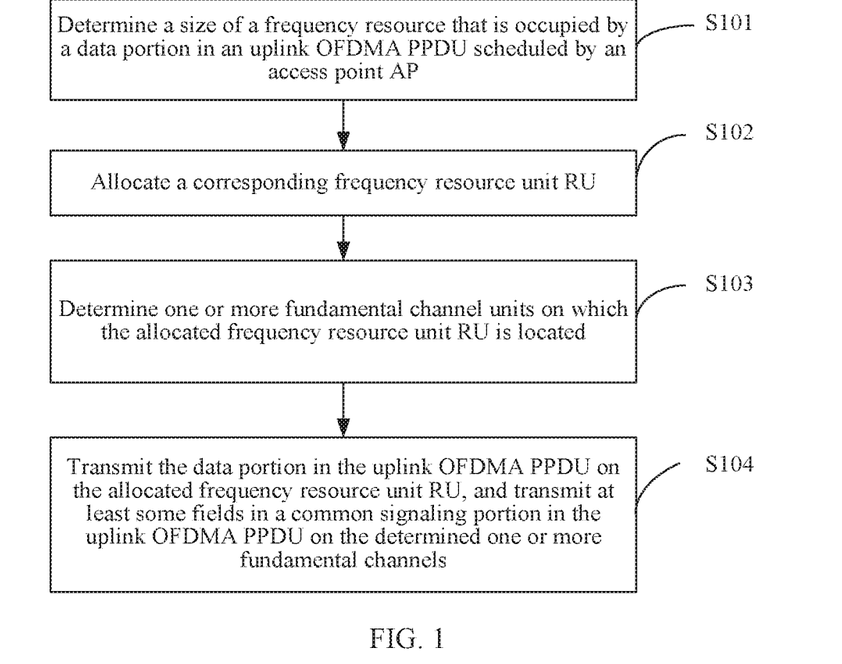
FIG. 1 is a flowchart of Embodiment 1 of a data transmission method in this application.

FIG. 1 is a flowchart of a data transmission method according to Embodiment 1 of this application. The method is applied to an uplink OFDMA PPDU corresponding to a downlink OFDMA PPDU. As shown in FIG. 1, the method may include the following steps.

S101: Determine a size of a frequency resource that is need by a data portion in an uplink OFDMA PPDU scheduled by an access point AP.

S102: Allocate a corresponding frequency resource unit RU.

The data portion in the uplink OFDMA PPDU includes uplink user data and/or uplink user MAC control signaling.

S103: Determine one or more fundamental channel units on which the allocated frequency resource unit RU is located.

The fundamental channel unit is preferably a 20 MHz channel. Certainly, the fundamental channel unit in this embodiment of the present invention is not limited to a 20 MHz channel, and any eligible channel can be used as the fundamental channel unit in this embodiment of the present invention.

S104: Transceive the data portion in the uplink OFDMA PPDU on the allocated frequency resource unit RU, and transceive at least some fields in a common signaling portion in the uplink OFDMA PPDU on the determined one or more fundamental channels.

Fields in the common signaling portion in the uplink OFDMA PPDU include at least a legacy preamble, and may further include an HE-SIG-A (High Efficient signal part A) or an HE-SIG-B (High Efficient signal part B). The HE-SIG-A is common resource indication signaling in the uplink OFDMA PPDU, and the HE-SIG-B is resource indication signaling for the user in the uplink OFDMA PPDU. It can be known according to a physical-layer frame format of the transmission frame that the legacy preamble includes a legacy short training sequence field, a legacy long training sequence field, and a legacy signaling field. The HE-SIG-A includes a bandwidth, an inter-symbol guard interval, and common signaling for setting a length and modulation coding of an HE-SIG-B, and the like. The HE-SIG-B is used to indicate information related to resources allocated to the target user and the like.

Optionally, the at least some fields in the common signaling portion in the uplink OFDMA PPDU frame include only a legacy preamble and an HE-SIG-A, or the common signaling portion in the uplink OFDMA PPDU frame includes a legacy preamble, an HE-SIG-A, and an HE-SIG-B.

Figure 2A:
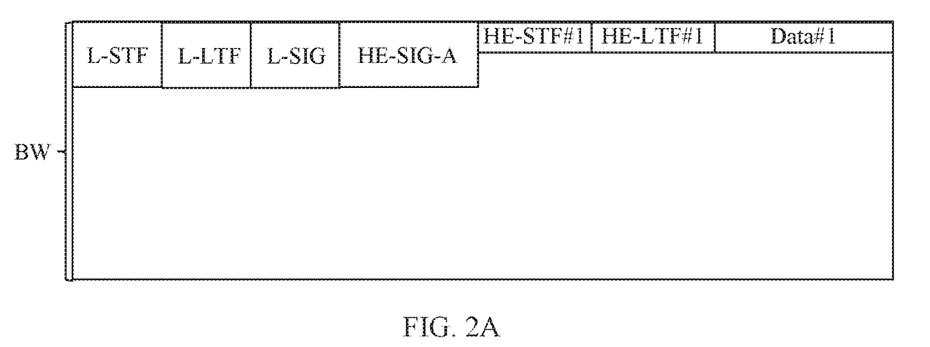
FIG. 2A is a simple schematic diagram of channel resources used when an uplink OFDMA PPDU frame is sent according to Embodiment 1 of this application.

When the at least some fields in the common signaling portion in the uplink OFDMA PPDU frame include only a legacy preamble and an HE-SIG-A, and the allocated frequency resource unit RU is located on only one fundamental channel unit, FIG. 2A is a simple schematic diagram of channel resources used when an uplink OFDMA PPDU frame is sent according to Embodiment 1 of the present invention.

Figure 2B:
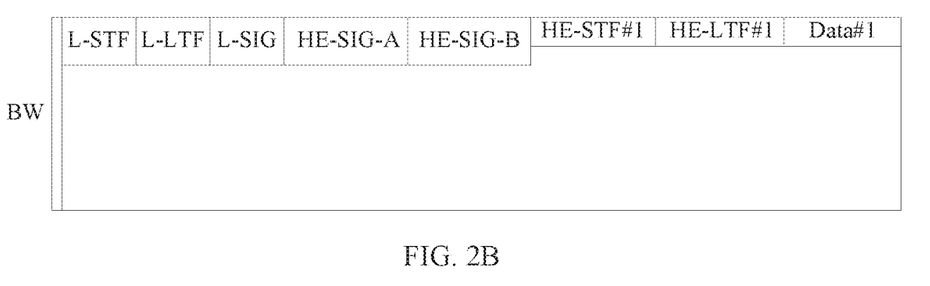
FIG. 2B is a simple schematic diagram of channel resources used when another uplink OFDMA PPDU frame is sent according to Embodiment 1 of this application.

Alternatively, when the at least some fields in the common signaling portion in the uplink OFDMA PPDU frame include a legacy preamble, an HE-SIG-A, and an HE-SIG-B, and the allocated frequency resource unit RU is located on only one fundamental channel unit, FIG. 2B is a simple schematic diagram of channel resources used when another uplink OFDMA PPDU frame is sent according to Embodiment 1 of the present invention.

For transmission of uplink data or uplink MAC control signaling by using the uplink OFDMA scheduled by the AP uplink user data or uplink user MAC control signaling is sent on the allocated RU, and the RU is located on a 20 MHz channel. The legacy preamble and the HE-SIG-A: or, the legacy preamble, the HE-SIG-A, and the HE-SIG-B, in the common signaling portion in the uplink OFDMA PPDU frame in Embodiment 1 of the present invention are sent on the 20 MHz channel including the RU, and the common signaling portion in the uplink OFDMA PPDU frame is not sent on any other channel(s) in the bandwidth.

Figure 3A:
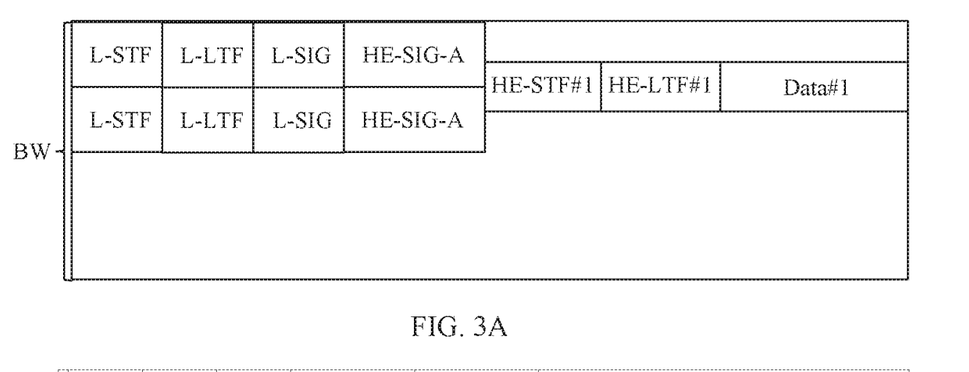
FIG. 3A is a simple schematic diagram of channel resources used when still another uplink OFDMA PPDU frame is sent according to Embodiment 1 of this application.

When the at least some fields in the common signaling portion in the uplink OFDMA PPDU frame include only a legacy preamble and an HE-SIG-A, and the allocated frequency resource unit RU is located in multiple fundamental channel units, as shown in FIG. 3A. FIG. 3A is a simple schematic diagram of channel resources used when still another uplink OFDMA PPDU frame is sent according to Embodiment 1 of the present invention.

Figure 3B:
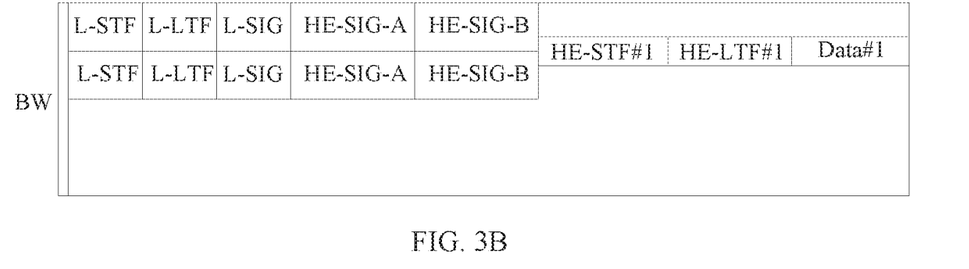
FIG. 3B is a simple schematic diagram of channel resources used when yet another uplink OFDMA PPDU frame is sent according to Embodiment 1 of this application.

Alternatively, when the at least some fields in the common signaling portion in the uplink OFDMA PPDU frame include a legacy preamble, an HE-SIG-A, and an HE-SIG-B, and the allocated frequency resource unit RU is located in multiple fundamental channel units, as shown in FIG. 3B, FIG. 3B is a simple schematic diagram of channel resources used when yet another uplink OFDMA PPDU frame is sent according to Embodiment 1 of the present invention.

For transmission of uplink data or uplink MAC control signaling by using the uplink OFDMA scheduled by the AP, uplink user data or uplink user MAC control signaling is sent on the allocated RU, and the RU is located in multiple 20 MHz channels. The legacy preamble and the HE-SIG-A, or the legacy preamble, the HE-SIG-A, and the HE-SIG-B in the common signaling portion in the uplink OFDMA PPDU frame are sent on the multiple 20 MHz channels where the RU is located, and are duplicated over each 20 MHz channel. The legacy preamble and the HE-SIG-A are not sent on any other channel(s) in the bandwidth.

Figure 4:
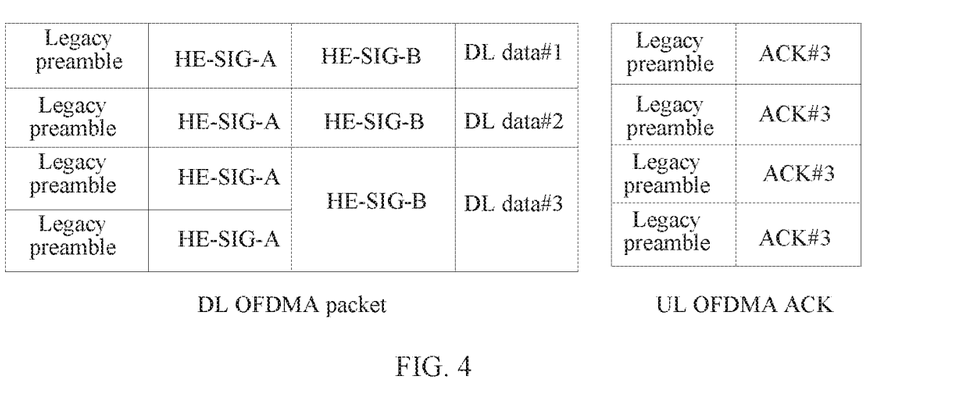
FIG. 4 is a simple schematic diagram of channel resources used when still yet another uplink OFDMA PPDU frame is sent according to Embodiment 1 of this application.

Optionally, when the at least some fields in the common signaling portion in the uplink OFDMA PPDU frame include only a legacy preamble, the data portion in the uplink OFDMA PPDU frame includes only ACK signaling, or the data portion in the uplink OFDMA PPDU frame includes uplink user data and uplink user ACK signaling. The ACK signaling belongs to MAC signaling, and the ACK signaling is located in a frequency resource on a basis of one or more fundamental channel. As shown in FIG. 4, FIG. 4 is a simple schematic diagram of channel resources used when another uplink OFDMA PPDU frame is sent according to Embodiment 1 of this application.

For a downlink OFDMA PPDU, uplink user ACK signaling uses a same symbol length as a legacy preamble, and there is no HE-SIG-A or HE-STF/LTF between the legacy preamble and the ACK. If the frequency resource unit RU is located in only one fundamental channel unit, and an RU is allocated for ACK of each user on a per 20 MHz basis, both the legacy preamble and the ACK signaling in the uplink OFDMA PPDU frame are sent on the allocated 20 MHz channel. If the frequency resource unit RU is located in multiple fundamental channel units, the legacy preamble and the ACK signaling are duplicated over the multiple 20 MHz channels where the RU located, and the legacy preamble and the ACK signaling are not sent on any other channel(s) in the bandwidth. For example, for a user #3, if an allocated RU is located in multiple 20 MHz channels, a legacy preamble and ACK signaling are duplicated over the third and fourth 20 MHz channels where a corresponding downlink resource located.

In this embodiment of the present invention, a data portion in an uplink OFDMA PPDU scheduled by an access point AP is transceived on an allocated frequency resource unit RU, and at least some fields in a common signaling portion in the uplink OFDMA PPDU are transceived on one or more fundamental channels where the frequency resource unit RU is located, for example, the at least some fields are transceived on one or more determined 20 MHz channels. In this way, because the one or more 20 MHz channels for transceiving the common signaling portion in the uplink OFDMA PPDU are already determinate, when another user in a conventional 802.11a/b/n/ac and 802.11ax BSS performs detection according to conventional CCA, the one or more 20 MHz channels are excluded, and the user performs detection on other idle 20 MHz channel(s) for a data portion. In this transmission manner, the another user in the BSS contends for an idle 20 MHz channel for a data portion, and the another user in the BSS can transceive data on an idle fundamental channel for a data portion, thereby improving channel utilization. In addition, multiple users can simultaneously transceive data on multiple fundamental channels, thereby improving a service transmission rate.

In addition, because the at least some fields in the common signaling portion in the uplink OFDMA PPDU are transceived over the one or more fundamental channels, and a fundamental channel has a relatively large capacity, where the fundamental channel is preferably 20 MHz, the one or more fundamental channels are capable of accommodating the at least some fields in the common signaling portion in the uplink OFDMA PPDU. Therefore, a complete common signaling portion is finally transceived to a receive end through the one or more fundamental channels, and transmission signaling is not lost in a transmission process.

According to the technical solution provided in this embodiment of the present invention, a data portion in an uplink OFDMA PPDU scheduled by an access point AP is transceived on a corresponding allocated frequency resource unit RU, one or more fundamental channel units where the allocated frequency resource unit RU is located are determined, and at least some fields in a common signaling portion in the uplink OFDMA PPDU are transceived on the determined one or more fundamental channels. In this way, one or more fundamental channels for transceiving at least some fields in a common signaling portion in an uplink OFDMA PPDU are determinate. When another user in a conventional 802.11a/b/n/ac and 802.11ax BSS performs detection according to conventional CCA, the user detects that the one or more fundamental channels for transceiving at least some fields in the common signaling portion in the uplink OFDMA PPDU are busy, and the user can transceive data in other idle fundamental channel(s), thereby improving channel utilization. In addition, multiple users can simultaneously transceive data on multiple fundamental channels, thereby improving a service transmission rate.

Embodiment 2

Figure 5:
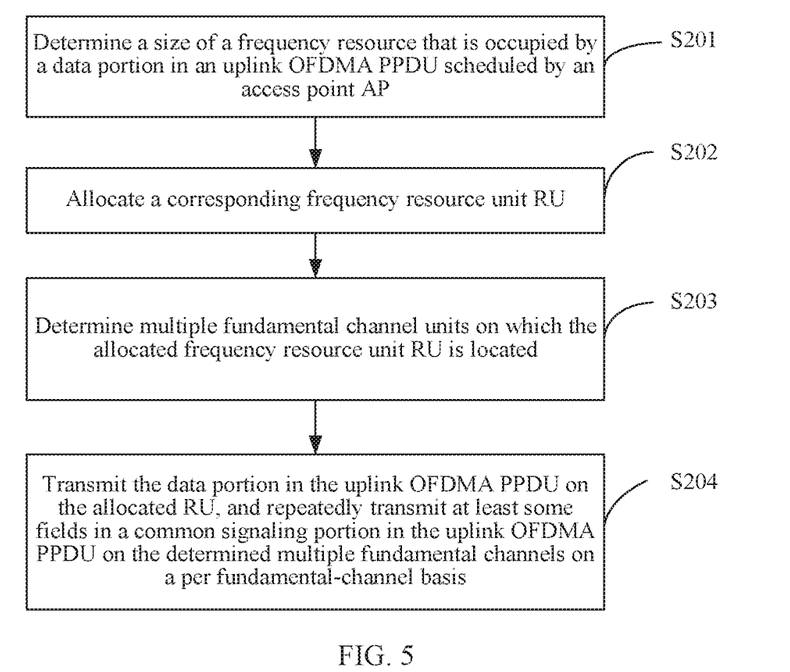
FIG. 5 is a flowchart of Embodiment 2 of a data transmission method in this application.

Embodiment 2 of the present invention further discloses another data transmission method. As shown in FIG. 5, the method includes the following steps.

S201: Determine a size of a frequency resource that is needed by a data portion in an uplink OFDMA PPDU scheduled by an access point AP.

S202: Allocate a corresponding frequency resource unit RU.

The data portion in the uplink OFDMA PPDU includes uplink user data and/or uplink user MAC control signaling.

S203: Determine multiple fundamental channel units where the allocated frequency resource unit RU is located.

The fundamental channel unit is preferably a 20 MHz channel. Certainly, the fundamental channel unit in this embodiment of the present invention is not limited to a 20 MHz channel, and any eligible channel can be used as the fundamental channel unit in this embodiment of the present invention.

S204: Transceive the data portion in the uplink OFDMA PPDU on the allocated frequency resource unit RU, and duplicated at least some fields in a common signaling portion in the uplink OFDMA PPDU over the determined multiple fundamental channels on a per fundamental-channel basis.

According to the technical solution provided in this embodiment of the present invention, data of a data portion in an uplink OFDMA PPDU scheduled by an access point AP is transceived on a corresponding allocated frequency resource unit RU, multiple fundamental channel units where the allocated frequency resource unit RU is located are determined, and at least some fields in a common signaling portion in the uplink OFDMA PPDU are transceived over the determined multiple fundamental channels. In this way, multiple fundamental channels for transceiving at least some fields in a common signaling portion in an uplink OFDMA PPDU are determinate. When another user in a conventional 802.11a-b/n/ac and 802.11ax BSS performs detection according to conventional CCA, the user detects that the multiple fundamental channels for transceiving at least some fields in the common signaling portion in the uplink OFDMA PPDU are busy, and the user can transceive data on other idle fundamental channel(s), thereby improving channel utilization. In addition, multiple users can simultaneously transceive data on multiple fundamental channels, thereby improving a service transmission rate.

Embodiment 3

Figure 6:
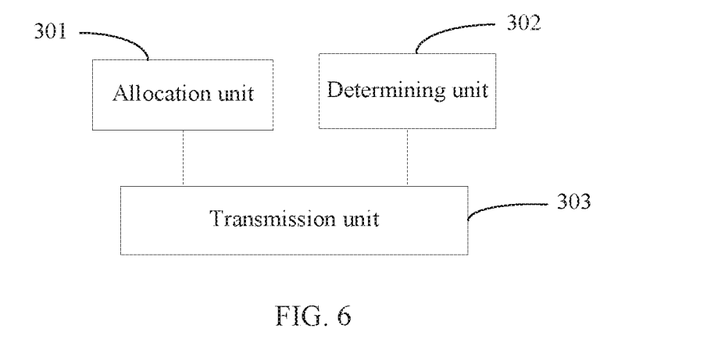
FIG. 6 is a structural diagram of Embodiment 3 of a data transmission apparatus in this application.

Embodiment 3 of the present invention describes in detail a data transmission apparatus. Referring to FIG. 6, the data transmission apparatus described in this embodiment includes an allocation unit 301, a determining unit 302, and a transmission unit 303.

The allocation unit 301 is configured to: determine a size of a frequency resource needed by a data portion in an uplink OFDMA PPDU scheduled by an access point AP, and allocate a corresponding frequency resource unit RU for transceiving the data portion in the uplink OFDMA PPDU.

The data portion in the uplink OFDMA PPDU includes uplink user data and/or uplink user MAC control signaling.

The determining unit 302 is configured to determine one or more fundamental channel units on which the allocated frequency resource unit RU is located.

The fundamental channel unit is preferably a 20 MHz channel. Certainly, the fundamental channel unit in this embodiment of the present invention is not limited to a 20 MHz channel, and any eligible channel can be used as the fundamental channel unit in this embodiment of the present invention.

The transmission unit 303 is configured to: transceive the data portion in the uplink OFDMA PPDU on the allocated frequency resource unit RU, and transceive at least some fields in a common signaling portion in the uplink OFDMA PPDU on the determined one or more fundamental channels.

Fields in the common signaling portion in the uplink OFDMA PPDU include at least a legacy preamble, and may further include an HE-SIG-A (High Efficient signal part A) or an HE-SIG-B (High Efficient signal part B). The HE-SIG-A is common resource indication signaling in the uplink OFDMA PPDU, and the HE-SIG-B is resource indication signaling for the user in the uplink OFDMA PPDU. It can be known according to a physical-layer frame format of the transmission frame that the legacy preamble includes a legacy short training sequence field, a legacy long training sequence field, and a legacy signaling field. The HE-SIG-A includes a bandwidth, an inter-symbol guard interval, and common signaling for setting a length and modulation coding of an HE-SIG-B, and the like. The HE-SIG-B is used to indicate information related to resources allocated to the target user and the like.

Optionally, the at least some fields in the common signaling portion in the uplink OFDMA PPDU frame include only a legacy preamble and an HE-SIG-A, or the common signaling portion in the uplink OFDMA PPDU frame includes a legacy preamble, an HE-SIG-A, and an HE-SIG-B.

For transmission of uplink data or uplink MAC control signaling scheduled by the AR by using the uplink OFDMA, an uplink user data or uplink user MAC control signaling is sent on the allocated RU, and the RU is located in only one 20 MHz channel. In Embodiment 3 of the present invention, the legacy preamble and the HE-SIG-A; or, the legacy preamble, the HE-SIG-A, and the HE-SIG-B, in the common signaling portion in the uplink OFDMA PPDU frame are sent on the 20 MHz channel including the RU, and the common signaling portion in the uplink OFDMA PPDU frame is not sent on any other channel(s) in the bandwidth.

For transmission of uplink data or uplink MAC control signaling scheduled by the AR by using the uplink OFDMA, an uplink user data or uplink user MAC control signaling is sent on the allocated RU, and the RU is located in multiple 20 MHz channels. The legacy preamble and the HE-SIG-A; or, the legacy preamble, the HE-SIG-A, and the HE-SIG-B in the common signaling portion in the uplink OFDMA PPDU frame are sent on the multiple 20 MHz channels where the RU is located, and are duplicated over each 20 MHz channel. The legacy preamble and the HE-SIG-A are not sent on any other channel(s) in the bandwidth.

Optionally, when the at least some fields in the common signaling portion in the uplink OFDMA PPDU frame include only a legacy preamble, the data portion in the uplink OFDMA PPDU frame includes only ACK signaling, or the data portion in the uplink OFDMA PPDU frame includes uplink user data and uplink user ACK signaling. The ACK signaling belongs to MAC signaling, and the ACK signaling is located in a frequency resource on a basis of per fundamental channel unit.

For a downlink OFDMA PPDU, uplink user ACK signaling uses a same symbol length as a legacy preamble, and there is no HE-SIG-A or HE-STF/LTF between the legacy preamble and the ACK. If the frequency resource unit RU is located in only one fundamental channel unit, and an RU is allocated for ACK of each user on a per 20 MHz basis, both the legacy preamble and the ACK signaling in the uplink OFDMA PPDU frame are sent on the allocated 20 MHz channel. If the frequency resource unit RU is located in multiple fundamental channel units, the legacy preamble and the ACK signaling are duplicated over the multiple 20 MHz channels, and the legacy preamble and the ACK signaling are not sent on any other channel(s) in the bandwidth. For example, for a user #3, if an allocated RU is located in multiple 20 MHz channels, a legacy preamble and ACK signaling are duplicated over the third and fourth 20 MHz channels where a corresponding downlink resource located.

In this embodiment of the present invention, a data portion in an uplink OFDMA PPDU scheduled by an access point AP is transceived on a frequency resource unit RU allocated by the allocation unit 301, and at least some fields in a common signaling portion in the uplink OFDMA PPDU are transceived on one or more fundamental channels on which the frequency resource unit RU is located and that are determined by the determining unit 302, for example, the at least some fields are transceived on one or more determined 20 MHz channels. In this way, because the one or more 20 MHz channels for transceiving the common signaling portion in the uplink OFDMA PPDU are already determinate, when another user in a conventional 802.11a/b/n/ac and 802.11ax BSS performs detection according to conventional CCA, the one or more 20 MHz channels are excluded, and the user performs detection on another idle 20 MHz channel for a data portion. In this transmission manner, the another user in the BSS contends for an idle 20 MHz channel for a data portion, and the another user in the BSS can transceive data on an idle fundamental channel for a data portion, thereby improving channel utilization. In addition, multiple users can simultaneously transceive data on multiple fundamental channels, thereby improving a service transmission rate.

In addition, because the at least some fields in the common signaling portion in the uplink OFDMA PPDU are transceived by the transmission unit 303 on the one or more fundamental channels, and a fundamental channel has a relatively large capacity of preferably 20 MHz, the one or more fundamental channels are capable of accommodating the at least some fields in the common signaling portion in the uplink OFDMA PPDU. Therefore, a complete common signaling portion is finally transceived to a receive end through the one or more fundamental channels, and transmission signaling is not lost in a transmission process.

According to the technical solution provided in this embodiment of the present invention, data of a data portion in an uplink OFDMA PPDU scheduled by an access point AP is transceived on a frequency resource unit RU allocated by the allocation unit 301, one or more fundamental channel units on which the allocated frequency resource unit RU is located are determined by the determining unit 302, and at least some fields in a common signaling portion in the uplink OFDMA PPDU are transceived by the transmission unit 303 on the determined one or more fundamental channels. In this way, one or more fundamental channels for transceiving at least some fields in a common signaling portion in an uplink OFDMA PPDU are determinate. When another user in a conventional 802.11a/b/nac and 802.11ax BSS performs detection according to conventional CCA, the user detects that the one or more fundamental channels for transceiving at least some fields in the common signaling portion in the uplink OFDMA PPDU are busy, and the user can transceive data on another idle fundamental channel, thereby improving channel utilization. In addition, multiple users can simultaneously transceive data on multiple fundamental channels, thereby improving a service transmission rate.

Embodiment 4

Figure 7:
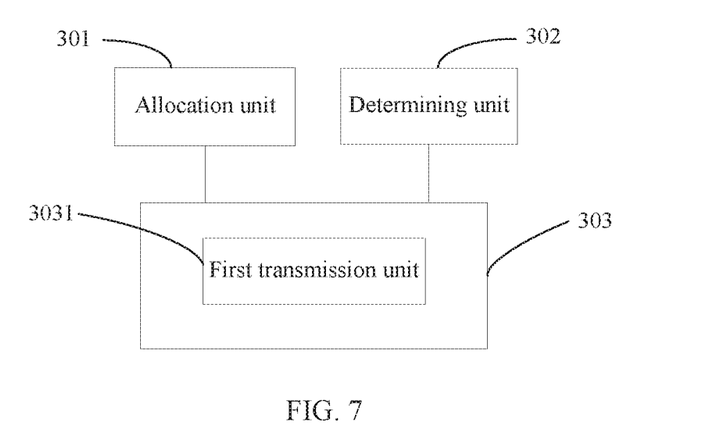
FIG. 7 is a structural diagram of Embodiment 4 of a data transmission apparatus in this application.

Embodiment 4 of the present invention describes in detail another data transmission apparatus. Referring to FIG. 7, the data transmission apparatus described in this embodiment includes: an allocation unit 301, a determining unit 302, and a transmission unit 303.

The allocation unit 301 is configured to: determine a size of a frequency resource that is needed by a data portion in an uplink OFDMA PPDU scheduled by an access point AP, and allocate a corresponding frequency resource unit RU for transceiving the data portion in the uplink OFDMA PPDU.

The data portion in the uplink OFDMA PPDU includes uplink user data and/or uplink user MAC control signaling.

The determining unit 302 is configured to determine one or more fundamental channel units on which the allocated frequency resource unit RU is located.

The fundamental channel unit is preferably a 20 MHz channel. Certainly, the fundamental channel unit in this embodiment of the present invention is not limited to a 20 MHz channel, and any eligible channel can be used as the fundamental channel unit in this embodiment of the present invention.

The transmission unit 303 is configured to: transceive the data portion in the uplink OFDMA PPDU on the allocated frequency resource unit RU, and transceive at least some fields in a common signaling portion in the uplink OFDMA PPDU on the determined one or more fundamental channels.

When the allocated frequency resource unit RU is located in multiple fundamental channels, the transmission unit 303 includes: a first transmission unit 3031, configured to repeatedly transceive, by using the determined multiple fundamental channels on a per fundamental-channel basis, the at least some fields in the common signaling portion in the uplink OFDMA PPDU on the multiple fundamental channels.

According to the technical solution provided in this embodiment of the present invention, data of a data portion in an uplink OFDMA PPDU scheduled by an access point AP is transceived on a frequency resource unit RU allocated by the allocation unit 301, multiple fundamental channel units on which the allocated frequency resource unit RU is located are determined by the determining unit 302, and at least some fields in a common signaling portion in the uplink OFDMA PPDU are transceived by the first transmission unit 3031 on the determined multiple fundamental channels. In this way, multiple fundamental channels for transceiving at least some fields in a common signaling portion in an uplink OFDMA PPDU are determinate. When another user in a conventional 802.11a/b/n/ac and 802.11ax BSS performs detection according to conventional CCA, the user detects that the multiple fundamental channels for transceiving at least some fields in the common signaling portion in the uplink OFDMA PPDU are busy, and the user can transceive data on another idle fundamental channel, thereby improving channel utilization. In addition, multiple users can simultaneously transceive data on multiple fundamental channels, thereby improving a service transmission rate.

An embodiment disclosed in the present invention further provides an access point, and the access point may include any data transmission apparatus as described above.

With reference to the data transmission method described in the embodiments disclosed in the present invention, data transmission may be implemented directly by hardware, a memory executed by a processor, or a combination thereof. Therefore, corresponding to the method and apparatus disclosed in the embodiments of the present invention, the present invention further discloses a data transmission system. A specific embodiment is given below for detailed description.

Figure 8:
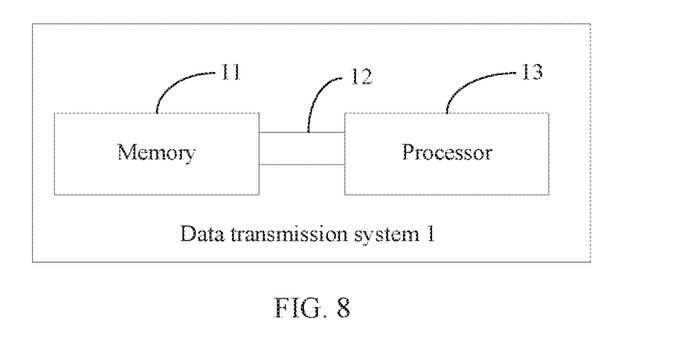
FIG. 8 is a structural diagram of a data transmission system in this application.

As shown in FIG. 8, the data transmission system 1 includes a memory 11 and a processor 13 that is connected to the memory 11 by using a bus 12.

The memory 11 has a storage medium, and the storage medium stores a data transmission program used to transceive data in the uplink OFDMA PPDU.

The memory 11 may include a high-speed RAM memory, and may also include a non-volatile memory, for example, at least one magnetic disk memory.

The processor 13 is connected to the memory 11 by using the bus 12. When data is transceived in the uplink OFDMA PPDU, the processor 13 invokes the data transmission method program that is used for transceiving data in the uplink OFDMA PPDU and that is stored in the memory 11. The database search program may include program code, and the program code includes a series of operation instructions arranged sequentially. The processor 13 may be a central processing unit CPU, or an application-specific integrated circuit, or may be one or more integrated circuits configured to implement this embodiment of the present invention.

The data transmission method program that is stored in the memory and that is invoked by the processor 13 may specifically include:

determining a size of a frequency resource that is needed by a data portion in an uplink OFDMA PPDU scheduled by an access point AP, and allocating a corresponding frequency resource unit RU for transceiving the data portion in the uplink OFDMA PPDU;

determining one or more fundamental channel units on which the allocated frequency resource unit RU is located: and transceiving the data portion in the uplink OFDMA PPDU on the allocated frequency resource unit RU, and transceiving at least some fields in a common signaling portion in the uplink OFDMA PPDU on the determined one or more fundamental channels.

With reference to the foregoing content, according to the technical solution provided in this embodiment of the present invention, an OFDMA technology is introduced based on the IEEE 802.11ax standard. Data of a data portion in an uplink OFDMA PPDU scheduled by an access point AP is transceived on a corresponding allocated frequency resource unit RU, one or more fundamental channel units on which the allocated frequency resource unit RU is located are determined, and at least some fields in a common signaling portion in the uplink OFDMA PPDU are transceived on the determined one or more fundamental channels. In this way, one or more fundamental channels for transceiving at least some fields in a common signaling portion in an uplink OFDMA PPDU are determinate. When another user in a conventional 802.11a/b/n/ac and 802.11ax BSS performs detection according to conventional CCA, the user detects that the one or more fundamental channels for transceiving at least some fields in the common signaling portion in the uplink OFDMA PPDU are busy, and the user can transceive data on another idle fundamental channel, thereby improving channel utilization. In addition, multiple users can simultaneously transceive data on multiple fundamental channels, thereby improving a service transmission rate.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

A person skilled in the art may further be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or software and hardware depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to enable a person skilled in the art to implement or use the present invention. Various modifications to the embodiments are obvious to the person skilled in the art, and general principles defined in this specification may be implemented in other embodiments without departing from the scope of the present invention. Therefore, the present invention will not be limited to the embodiments described in this specification but extends to the widest scope that complies with the principles and novelty disclosed in this specification.

What is claimed is:

1. A data transmission method for transmitting an uplink Orthogonal Frequency Division Multiple Access (OFDMA) physical layer convergence protocol data unit (PPDU) in a bandwidth that is of multiple fundamental channels, wherein the uplink OFDMA PPDU comprises a common signaling portion and a data portion, the common signaling portion includes a legacy preamble and a high efficient signal part A (HE-SIG-A), a frequency resource unit (RU) within the bandwidth is allocated for the data portion, and the RU is located within one or more fundamental channels of the multiple fundamental channels; the method comprising:
sending, by a station (STA), the legacy preamble and the HE-SIG-A only on the one or more fundamental channels where the RU is located; and sending, by the STA, the data portion in the uplink OFDMA PPDU on the RU.

2. The method according to claim 1, wherein the one or more fundamental channels comprise a plurality of fundamental channels, and the sending the legacy preamble and the HE-SIG-A only on the one or more fundamental channels comprises:
duplicating the legacy preamble and the HE-SIG-A, and sending the duplicated legacy preamble and HE-SIG-A over each of the plurality of fundamental channels.

3. The method according to claim 1, wherein each of the one or more fundamental channels is 20 MHz.

4. The method according to claim 1, wherein the data portion in the uplink OFDMA PPDU includes at least one of the following: uplink user data, or, uplink user medium access control (MAC) signaling.

5. The method according to claim 1, further comprising:
sending a high efficient-short training field (HE-STF) and a high efficient-short training field (HE-LTF) in the uplink OFDMA PPDU on the RU.

6. The method according to claim 1, wherein the uplink OFDMA PPDU is formatted based on 802.11ax standard.

7. A data transmission apparatus, comprising:
a memory having a storage medium, wherein the memory stores a program used for transmitting an uplink Orthogonal Frequency Division Multiple Access (OFDMA) physical layer convergence protocol data unit (PPDU) in a bandwidth that is of multiple fundamental channels, the uplink OFDMA PPDU comprises a common signaling portion and a data portion, the common signaling portion includes a legacy preamble and a high efficient signal part A (HE-SIG-A), a frequency resource unit (RU) within the bandwidth is allocated for the data portion, and the RU is located within one or more fundamental channels of the multiple fundamental channels in the bandwidth; and
at least one processor that is connected to the memory, and the at least one processor invokes the program stored in the memory, and is configured to execute the program to cause the data transmission apparatus to:
send the legacy preamble and the HE-SIG-A only on the one or more fundamental channels where the RU is located; and send the data portion in the uplink OFDMA PPDU on the RU.

8. The apparatus according to claim 7, wherein the one or more fundamental channels comprise a plurality of fundamental channels, and the at least one processor invokes the program stored in the memory, and is configured to execute the program to cause the data transmission apparatus to:
duplicate the legacy preamble and the HE-SIG-A, and send the duplicated legacy preamble and HE-SIG-A over each of the plurality of fundamental channels.

9. The apparatus according to claim 7, wherein each of the one or more fundamental channels is 20 MHz.

10. The apparatus according to claim 7, wherein the data portion in the uplink OFDMA PPDU includes at least one of the following: uplink user data, or, uplink user medium access control (MAC) signaling.

11. The apparatus according to claim 7, wherein the at least one processor invokes the program stored in the memory, and is configured to execute the program to cause the data transmission apparatus to:
send a high efficient-short training field (HE-STF) and a high efficient-short training field (HE-LTF) in the uplink OFDMA PPDU on the RU.

12. The apparatus according to claim 7, wherein the uplink OFDMA PPDU is formatted based on 802.11ax standard.

13. The apparatus according to claim 7, wherein the apparatus is a station.

14. A computer program product comprising non-transitory computer readable medium storing a program used for transmitting an uplink Orthogonal Frequency Division Multiple Access (OFDMA) physical layer convergence protocol data unit (PPDU) in a bandwidth that is of multiple fundamental channels, wherein the uplink OFDMA PPDU comprises a common signaling portion and a data portion, the common signaling portion includes a legacy preamble and a high efficient signal part A (HE-SIG-A), a frequency resource unit (RU) within the bandwidth is allocated for the data portion, the RU is located within one or more fundamental channels of the multiple fundamental channels in the bandwidth; and the program, when executed by at least one processor, causes the at least one processor to perform following operations:
sending the legacy preamble and the HE-SIG-A only on the one or more fundamental channels where the RU is located; and
sending the data portion in the uplink OFDMA PPDU on the RU.

15. The computer program product according to claim 14, wherein the one or more fundamental channels comprise a plurality of fundamental channels, and the sending the legacy preamble and the HE-SIG-A only on the one or more fundamental channels where the RU is located comprises:
duplicating the legacy preamble and the HE-SIG-A, and sending the duplicated legacy preamble and HE-SIG-A over each of the plurality of fundamental channels.

16. The computer program product according to claim 14, wherein each of the one or more fundamental channels is 20 MHz.

17. The computer program product according to claim 14, wherein the data portion in the uplink OFDMA PPDU includes at least one of the following: uplink user data, or, uplink user medium access control (MAC) control signaling.

18. The computer program product according to claim 14, further comprising:
sending a high efficient-short training field (HE-STF) and a high efficient-short training field (HE-LTF) in the uplink OFDMA PPDU on the RU.

19. The computer program product according to claim 14, wherein the uplink OFDMA PPDU is formatted based on 802.11ax standard.

* * * * *